May 2, 1967     J. J. COLEMAN ETAL     3,317,347
NICKEL ELECTRODE AND METHOD OF MAKING SAME
Filed July 2, 1962
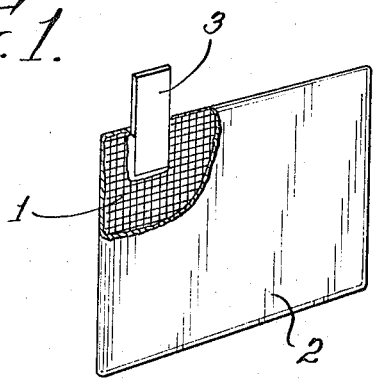
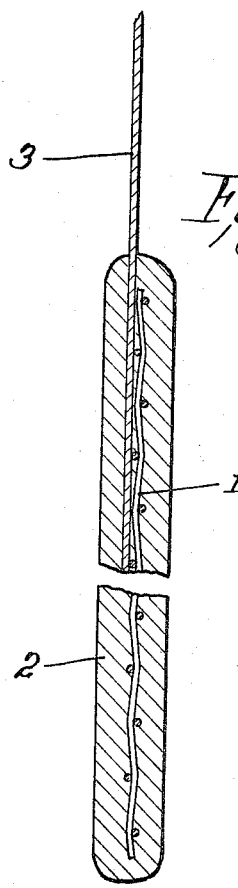
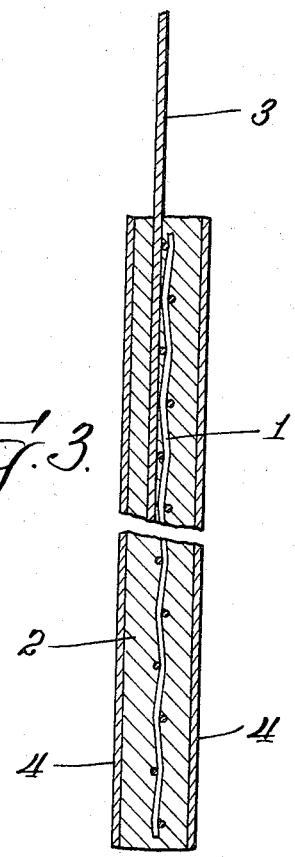
Inventors
Joseph J. Coleman,
Milton E. Wilke and
Clifford J. Vander Yacht
By Darbo, Robertson & Vandenburgh Att'ys.

3,317,347
NICKEL ELECTRODE AND METHOD OF
MAKING SAME
Joseph J. Coleman, Milton E. Wilke, and Clifford J.
Vander Yacht, Freeport, Ill., assignors to Servel, Inc.,
Evansville, Ind., a corporation of Delaware
Filed July 2, 1962, Ser. No. 206,620
15 Claims. (Cl. 136—28)

This invention relates to secondary batteries, and more particularly refers to a novel method for providing a porous electrode for a nickel-cadmium cell, and to the electrode produced thereby.

In order to perform satisfactorily, electrodes for use in nickel-cadmium batteries must have a very large surface area. To accomplish this end, they are generally prepared according to prior art methods by first forming what is generally termed a porous grid or plaque as a support for the active material and to provide the necessary conductivity. To produce the plaque, carbonyl nickel powder is placed on both sides of a nickel screen and sintered thereto under elevated temperature and molding pressure. After the porous plaque is thus formed, the active electrode material, generally comprising a hydrated oxide of trivalent nickel, must be introduced into the pores throughout the plaque. The process for introducing the active material comprises a number of steps. In the first step the sintered plaque is subjected to a vacuum, and, while under vacuum, immersed in an aqueous solution of nickel nitrate. When the vacuum is removed, the nickel nitrate solution is forced into the pores under pressure. In the second step, the plaque is immersed in a solution of potassium hydroxide and placed under cathodic polarization by means of an electrolyzing current to reduce the nitrate to an oxide or hydroxide. The remaining unreacted soluble products are washed out by rinsing in water, and the plaque is dried.

In order to introduce sufficient active material, the complete cycle of steps outlined above must be repeated four or five times. Since almost an entire day is consumed in carrying out each cycle of steps, it can be readily seen that the entire process is extremely time-consuming, and costly.

It is an object of the invention to provide a method for producing a porous electrode for a nickel-cadmium cell which is considerably less time-consuming then prior art methods.

It is a further object to provide a method for producing such an electrode which is less costly.

It is a further object to provide an electrode which does not require expensive carbonyl nickel powder to be utilized for its production, and which can be produced from less costly materials.

It is a further object to provide a porous nickel electrode for a nickel-cadmium battery in which the formation of the conductive grid or plaque and introduction of active material is accomplished in a single cycle and avoids the necessity for utilizing a plurality of cycles, each of which comprises a plurality of steps.

Other objects and advantages of the invention will become apparent from the description which follows when taken in conjunction with the appended drawing in which:

FIG. 1 is a perspective view of a nickel electrode according to the invention.

FIG. 2 is a cross-section of the electrode; and

FIG. 3 is a cross-section of the electrode in another embodiment.

According to the invention, a composition is prepared comprised of nickel hydroxide and a resinous binder contained in a solvent for said binder. The composition may also include a minor proportion of a conductive material such as finely divided carbon or a powdered metal such as nickel or iron. Further, in order to increase the mechanical strength, a sheet of a bibulous material such as Webril may be advantageously placed over the coating on both sides of the screen. The solvent is permitted to evaporate, leaving a dry coating adherent on both sides of the screen. The electrode thus produced is then treated in a nickel-plating bath, and a fine network of nickel is formed around the active material. The electrode is washed and dried, and, if desired, compressed in order to increase its density and mechanical strength. The electrode thus formed may then be used in the assembly of a cell.

The electrode shown in FIG. 1 comprises a nickel screen 1 on both sides of which is contained a coating 2 of active material comprised of nickel hydroxide and a resinous binder. Additionally, a finely-divided conductive material such as carbon particles or a powdered metal such as nickel or iron may be dispersed therein. The presence of the conducting material increases the conductivity of the electrode. A tab 3 of a conductive metal such as nickel is affixed to the screen by any suitable method such as welding. The electrode is shown in cross-section in FIG. 2.

After the electrode has been formed, it must be treated in a nickel-plating bath in order to render it more conductive. This may be done by immersing the electrode in a commercial nickel-plating solution and subjecting it to cathodic electrolysis. The nickel plating may alternatively be applied by the so-called "electroless" nickel-plating process which involves the chemical reduction of a nickel compound in a suitable plating bath.

In FIG. 3 is shown a modified form of the invention. It has been found that after the wet coating containing the nickel hydroxide and resinous binder in a solvent has been applied on the nickel screen, it may be advantageous to place a sheet of a fabric such as Webril over each surface of the coating to maintain the coating in place at least until it has dried. The fabric sheet may then be removed and the electrode subsequently subjected to nickel plating. For some types of electrodes the fabric coating may be advantageously left on the electrode. Nickel plating may be applied to the entire assembly without removing the fabric covering. After plating, the covered electrode may be assembled into the cell intact. When the fabric sheets are used, a smaller portion of binder may be used, since the presence of the sheet provides added mechanical strength.

The following examples illustrate in detail the preparation of porous electrodes according to the invention.

EXAMPLE 1

A mixture of 138 g. nickel hydroxide and 4½ g. Shawinigan black (an acetylene black) was placed in a ball mill and milled until the mixture was uniform. Ninety-five grams of the mixture were then dispersed in 100 g. of a solution containing 5% by weight polyisobutylene in carbon tetrachloride. The solid contents of the resultant mixture were as follows:

| | Percent |
|---|---|
| Shawinigan black | 3 |
| Nickel hydroxide | 92 |
| Polyisobutylene | 5 |

The paste-like composition produced above was coated over both sides of a 1¾ x 2 inch 20-mesh nickel screen comprised of .007 nickel wire and having a small nickel tab welded to one edge of the screen for use as a terminal. A sufficient amount of the composition was utilized to produce a dry coating having a thickness of about .050″ on each side.

A Webril sheet was applied over both coated surfaces to hold the coating in place until dry. After the carbon tetrachloride had evaporated, the sheet was placed in a commercial nickel-plating solution comprised of nickel sulfate and nickel chloride. An electrolyzing current of .18 ampere was applied to the coated screen for five hours. The electrode thus formed was then washed, dried, and compressed in a press at a pressure of about 7 tons/sq. in. to increase its density and mechanical strength. The plated electrode was then assembled, together with a cadmium anode, into a nickel-cadmium cell. The electrode, upon test, was found to have a capacity of about 3.75 ampere-hours per cubic inch.

EXAMPLE 2

A coating composition was prepared in a manner similar to that of Example 1, except that 3% nicked powder was substituted for the Shawinigan black component. The composition was coated on both sides of a nickel screen and a sheet of Webril placed over each coating for mechanical support. The coating was then dried. The Webril sheets were stripped off, and the electrode electrolyzed in a plating bath at the same current density and for the same period of time as in Example 1. When the plating had been accomplished, the electrode was compressed to increase its density.

The electrodes of the invention, as formed in the above examples, may be directly assembled in a nickel-cadmium cell. When this is done, the cell must subsequently be charged. If desired, the electrode itself may be precharged before cell assembly by anodically electrolyzing it with a current in an alkaline electrolyte. This results in the conversion of the nickelous hydroxide to a nickelic hydroxide or oxide, the precise structure of which is not definitely known.

In addition to Webril, other fabrics not affected by the cell electrolyte such as nylon may be used.

The amount of nickel hydroxide used in preparing the active material to be coated on the screen depends upon the cell capacity desired, as well as the space available in the particular cell.

The proportion of conductive material, when such a material is used, is not critical. Large proportions increase the conductivity of the electrode. However, the space available for the active nickel hydroxide is thus curtailed and the overall capacity of the cell may be adversely affected. Even where little or no conductive material is added, subsequent electroplating of the electrode to a greater degree may compensate therefor and result in an electrode which still has good conductivity. Generally, an amount of about 3% by weight is optimum. In addition to acetylene black, other electrically conductive carbonaceous material such as graphite may be used.

The proportion of resinous binder to the remainder of the components also is not critical. An amount of about 5% gives satisfactory results. If the proportion is lowered much below 5%, the resulting electrode becomes too brittle and weak. If the proportion is increased to 10% or greater, the activity of the electrode is reduced as much as 50% because of the loss of conductivity, as well as a loss in space for the active material. Various resinous materials which are not adversely affected by the electrolyte may be used. Among these are polystyrene, polyisobutylene, vinyl chloride, vinyl acetate, acrylics, and other resins, as well as copolymers thereof.

The plating process should be carried out until an adequate network of nickel is formed surrounding the active particles of nickel hydroxide. When little or no conductive particles are added to the coating composition, the plating process should be carried out to a greater extent. On the other hand, where 3% or more by weight of the conductive material is used, the amount of plating may be reduced.

The electrodes produced as described above, may be assembled into nickel-cadmium cells by any of the processes known in the art. The electrodes may be precharged before assembly, or, alternatively, may be first assembled into the cell and the entire cell subsequently charged.

Although the electrode of the present invention has been described in only relatively few embodiments, variations thereof may be practiced by those skilled in the art without departing from the spirit and scope of the invention as defined in the appended claims.

What is claimed is:

1. A method for the production of a porous nickel cathode for a nickel-cadmium cell which comprises coating a composition consisting essentially of nickel hydroxide, a water-insoluble resin, and an organic solvent for said resin on a conductive metal screen, evaporating said solvent to form a dry adherent coating on said screen, and treating said coated screen in a nickel-plating bath to deposit nickel throughout said coating.

2. A method for the production of a porous nickel cathode for a nickel-cadmium cell which comprises coating a composition consisting essentially of nickel hydroxide, a water-insoluble resin, and an organic solvent for said resin on a conductive metal screen, evaporating said solvent to form a dry adherent coating on said screen, and cathodically electrolyzing said coated screen in a nickel-plating bath to deposit nickel grid throughout said coating.

3. A method according to claim 1 wherein said water-insoluble resin is polyisobutylene.

4. A method according to claim 1 wherein said water-insoluble resin is polyisobutylene and said solvent is carbon tetrachloride.

5. A method according to claim 1 wherein said water-insoluble resin is polystyrene.

6. A method according to claim 1 wherein said nickel-plating bath is comprised of an aqueous solution of nickel chloride and nickel sulfate.

7. A method for the production of a porous nickel cathode for a nickel-cadmium cell which comprises coating a composition consisting essentially of nickel hydroxide, finely divided particles of an electrically conductive material, a water-insoluble resin, and an organic solvent for said resin on a conductive metal screen, evaporating said solvent to form a dry adherent coating of said composition on said screen, and treating said coated screen in a nickel-plating bath to deposit nickel throughout said coating.

8. A method according to claim 7 wherein said electrically conductive particles are carbon.

9. A method according to claim 7 wherein said electrically conductive particles are graphite.

10. A method according the claim 7 wherein said electrically conductive particles are nickel.

11. A method for the production of a porous nickel cathode for a nickel-cadmium cell which comprises applying a coating of a composition consisting essentially of nickel hydroxide, electrically conductive finely divided particles, a water-insoluble resin, and a solvent for said resin on both sides of a conductive metal screen, applying a fabric sheet over each coating, evaporating said solvent to form a dry adherent coating on both sides of said screen, and electroplating said coated screen in a nickel-plating bath to deposit nickel throughout said coating.

12. A method according to cyaim 11 wherein said fabric is a non-woven cellulosic fiber sheet.

13. A method according to claim 11 wherein said electrically conductive particles are graphite.

14. A method for the production of a porous nickel cathode for a nickel-cadmium cell which comprises applying a coating of a composition consisting essentially of nickel hydroxide, finely divided particles of an electrically conductive material, a water-insoluble resin, and an organic solvent for said resin on a nickel screen, evaporating said solvent to form a dry adherent coating of said composition on said screen, and cathodically electrolyzing said coated screen in a nickel-plating bath to deposit nickel throughout said coating.

15. A porous nickel cathode for a cadmium cell comprised of a nickel screen and a coating contained on said screen, said coating consisting essentially of nickel hydroxide contained within a fine network of nickel, said electrode having been formed by applying a coating composition consisting essentially of nickel hydroxide, a water-insoluble resin, and an organic solvent for said resin on said metal screen, evaporating said solvent to form a dry adherent coating on said screen, and treating said electrode in a nickel-plating bath to deposit nickel throughout said coating.

References Cited by the Examiner

UNITED STATES PATENTS

| 2,191,813 | 2/1940 | Brown | 204—14 |
| 2,499,419 | 3/1950 | Ruben | 136—107 |
| 2,737,541 | 3/1956 | Coolidge | 136—20 |
| 3,009,980 | 11/1961 | Corren et al. | 136—34 |
| 3,053,925 | 9/1962 | Donohue | 136—70 |
| 3,075,033 | 1/1963 | Salkind | 136—24 |
| 3,121,029 | 2/1964 | Duddy | 136—120 X |

WINSTON A. DOUGLAS, *Primary Examiner.*

MURRAY TILLMAN, ALLEN B. CURTIS, *Examiners.*

B. J. OHLENDORF, A. SKAPARS, *Assistant Examiners.*